United States Patent
Ohta et al.

(10) Patent No.: US 11,546,797 B2
(45) Date of Patent: Jan. 3, 2023

(54) COMMUNICATION DEVICE, COMMUNICATION METHOD, AND COMMUNICATION SYSTEM

(71) Applicant: FUJITSU LIMITED, Kawasaki (JP)

(72) Inventors: Yoshiaki Ohta, Yokohama (JP);
Yoshihiro Kawasaki, Kawasaki (JP);
Takayoshi Ode, Yokohama (JP);
Shinichiro Aikawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 257 days.

(21) Appl. No.: 16/725,265

(22) Filed: Dec. 23, 2019

(65) Prior Publication Data
US 2020/0137625 A1    Apr. 30, 2020

Related U.S. Application Data

(63) Continuation of application No. PCT/JP2017/024457, filed on Jul. 4, 2017.

(51) Int. Cl.
*H04W 28/06* (2009.01)
*H04L 1/18* (2006.01)
(Continued)

(52) U.S. Cl.
CPC ........... *H04W 28/06* (2013.01); *H04L 1/1835* (2013.01); *H04W 24/08* (2013.01); *H04W 28/14* (2013.01); *H04L 43/0888* (2013.01); *H04W 80/06* (2013.01)

(58) Field of Classification Search
CPC ..... H04W 28/06; H04W 28/14; H04W 24/08; H04W 80/06; H04L 1/1835; H04L 1/00;
(Continued)

(56) References Cited

U.S. PATENT DOCUMENTS

2003/0154328 A1*   8/2003   Henderson .............. H04L 69/16
                                                                710/1
2005/0027878 A1    2/2005   Sin et al.
(Continued)

FOREIGN PATENT DOCUMENTS

JP      2005-51738 A     2/2005
WO      2016/190181 A1   12/2016

OTHER PUBLICATIONS

Ohta et al., "TCP Throughput Improvement Considering Wireless Access Scheme in LTE-Advanced Uplink: Examination of TCP ACK Transmission Methods", IEICE Technical Report, vol. 116, No. 147, pp. 65-70, Jul. 13, 2016, with English abstract.
(Continued)

*Primary Examiner* — Hassan Kizou
*Assistant Examiner* — Hector Reyes
(74) *Attorney, Agent, or Firm* — Myers Wolin, LLC

(57) ABSTRACT

A first communication device in a communication systems including the first communication device and the second communication device that performs wireless connection with the first communication device and relays communication with the first communication device, the first communication device includes a receiver configured to receive packets from the second communication device, and a transmitter configured to store reception confirmation packets corresponding to the packets in a buffer, perform transmission at least a portion of the reception confirmation packets stored in the buffer, and discard reception confirmation packets not to be transmitted in the transmission according to a discard ratio.

15 Claims, 17 Drawing Sheets

(51) Int. Cl.
    H04W 24/08      (2009.01)
    H04W 28/14      (2009.01)
    H04L 43/0888    (2022.01)
    H04W 80/06      (2009.01)
(58) Field of Classification Search
    CPC ..... H04L 1/16; H04L 1/1838; H04L 43/0888;
              H04L 43/16; H04L 47/323; H04L 29/08
    See application file for complete search history.

(56)                    References Cited

U.S. PATENT DOCUMENTS

2006/0067222 A1*  3/2006  Endoh ............... H04L 69/16
                                                     370/231
2007/0260745 A1* 11/2007  Moutarlier ......... H04L 69/16
                                                     709/230
2010/0091785 A1*  4/2010  Monzawa ........... H04L 47/326
                                                     370/412
2010/0296399 A1* 11/2010  Watanabe .......... H04L 47/14
                                                     370/235
2018/0132133 A1*  5/2018  Takahashi .......... H04L 1/1607
2019/0045388 A1*  2/2019  Zhang .............. H04L 69/16
2019/0297020 A1*  9/2019  Mudireddy ......... H04L 1/1854
2021/0273889 A1*  9/2021  Osuga ............... H04L 47/32

OTHER PUBLICATIONS

Ohta et al., "TCP Throughput Improvement Considering Wireless Access Scheme in LTE-Advanced Uplink", IEICE Technical Report, vol. 115, No. 472, pp. 321-326, Feb. 24, 2016, with English abstract.
3GPP TS 36.300 V11.14.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Dec. 2015.
3GPP TS 36.211 V13.2.0, "3rd Generation Partnership Project; Technical Specification Group Radio Access Network; Evolved Universal Terrestrial Radio Access (E-UTRA); Physical channels and modulation (Release 13)", Jun. 2016.
3GPP TS 36.212 V13.2.0, "3rd Generation Partnership Project; Technical Specification Group Radio Access Network; Evolved Universal Terrestrial Radio Access (E-UTRA); Multiplexing and channel coding (Release 13)", Jun. 2016.
ETSI TS 136 213 V13.0.0, "LTE; Evolved Universal Terrestrial Radio Access (E-UTRA); Physical layer procedures (3GPP TS 36.213 version 13.0.0 Release 13)", May 2016.
3GPP TS 36.321 V13.1.0, "3rd Generation Partnership Project; Technical Specification Group Radio Access Network; Evolved Universal Terrestrial Radio Access (E-UTRA); Medium Access Control (MAC) protocol specification (Release 13)", Mar. 2016.
ETSI TS 136 322 V8.8.0, "LTE; Evolved Universal Terrestrial Radio Access (E-UTRA); Radio Link Control (RLC) protocol specification (3GPP TS 36.322 version 8.8.0 Release 8)", Jul. 2010.
ETSI TS 136 323 V14.5.0, "LTE; Evolved Universal Terrestrial Radio Access (E-UTRA); Packet Data Convergence Protocol (PDCP) specification (3GPP TS 36.323 version 14.5.0 Release 14)", Jan. 2018.
ETSI TS 136 331 V13.0.0, "LTE; Evolved Universal Terrestrial Radio Access (E-UTRA); Radio Resource Control (RRC); Protocol specification (3GPP TS 36.331 version 13.0.0 Release 13)", Jan. 2016.
3GPP TS 36.413 V12.6.0, "3rd Generation Partnership Project; Technical Specification Group Radio Access Network; Evolved Universal Terrestrial Radio Access Network (E-UTRAN); S1 Application Protocol (S1AP) (Release 12)", Jun. 2015.
ETSI TS 136 423 V12.3.0, "LTE; Evolved Universal Terrestrial Radio Access Network (E-UTRAN); X2 Application Protocol (X2AP) (3GPP TS 36.423 version 12.3.0 Release 12)", Sep. 2014.
3GPP TS 36.425 V15.0.0, "3rd Generation Partnership Project; Technical Specification Group Radio Access Network; Evolved Universal Terrestrial Radio Access Network (E-UTRAN); X2 interface user plane protocol (Release 15)", Jun. 2018.
ETSI TR 138 912 V14.0.0, "5G; Study on New Radio (NR) access technology (3GPP TR 38.912 version 14.0.0 Release 14)", May 2017.
ETSI TR 138 913 V14.2.0, "5G; Study on Scenarios and Requirements for Next Generation Access Technologies (3GPP TR 38.913 version 14.2.0 Release 14)", May 2017.
3GPP TR 38.801 V14.0.0, "3rd Generation Partnership Project; Technical Specification Group Radio Access Network; Study on new radio access technology: Radio access architecture and interfaces (Release 14)", Mar. 2017.
3GPP TR 38.802 V14.2.0, "3rd Generation Partnership Project; Technical Specification Group Radio Access Network; Study on New Radio Access Technology Physical Layer Aspects (Release 14)", Sep. 2017.
3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.
3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.
3GPP TR 38.900 V15.0.0, "3rd Generation Partnership Project; Technical Specification Group Radio Access Network; Study on channel model for frequency spectrum above 6 GHz (Release 15)," Jun. 2018.
International Search Report issued by the Japan Patent Office for corresponding International Patent Application No. PCT/JP2017/024457, dated Sep. 26, 2017, with an English translation.
Written Opinion of the International Searching Authority issued for corresponding International Patent Application No. PCT/JP2017/024457, dated Sep. 26, 2017, with an English translation.
Notice of Reasons for Refusal issued by the Japan Patent Office for corresponding Japanese Patent Application No. 2019-528225, dated Nov. 10, 2020, with an English machine translation.

* cited by examiner

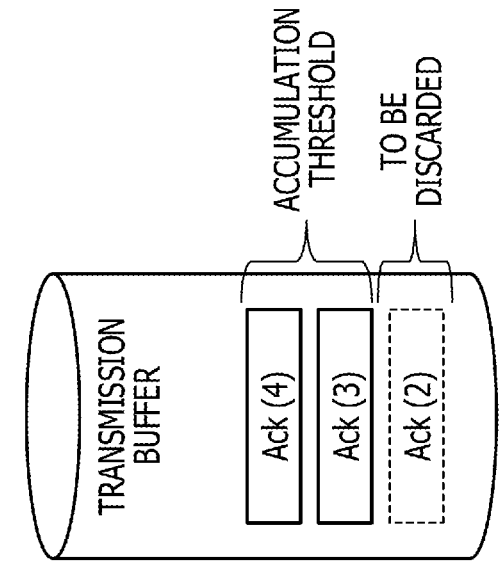
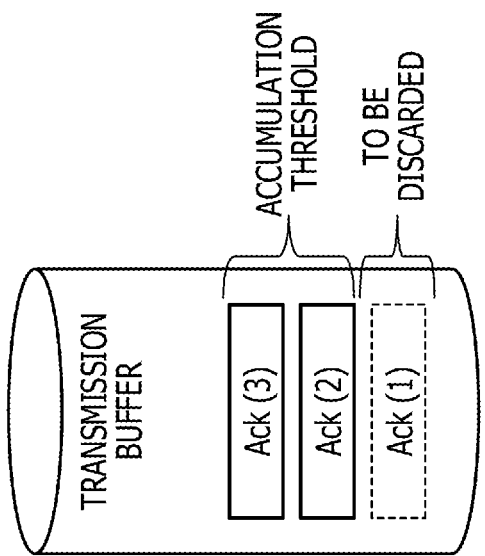
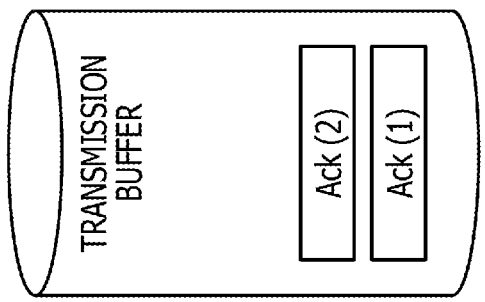

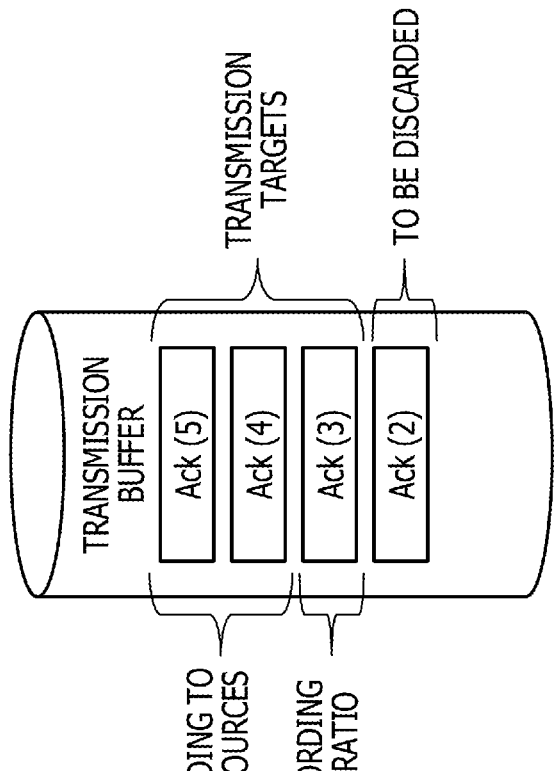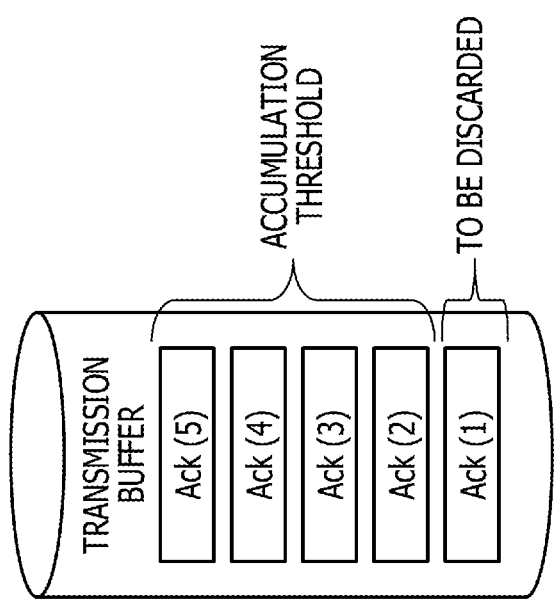

US 11,546,797 B2

COMMUNICATION DEVICE, COMMUNICATION METHOD, AND COMMUNICATION SYSTEM

CROSS-REFERENCE TO RELATED APPLICATION

This application is a continuation application of International Application PCT/JP2017/024457 filed on Jul. 4, 2017 and designated the U.S., the entire contents of which are incorporated herein by reference.

FIELD

The embodiments discussed herein are related to a communication device, a communication method, and a communication system.

BACKGROUND

At present, 3rd Generation Partnership Project (3GPP), which is a standardization organization, has completed or studied specifications of long term evolution (LTE) systems and LTE-Advanced (LTE-A) systems based on LTE systems.

In data communication in LTE, there is a case where a communication protocol called transmission control protocol/Internet protocol (TCP/IP) is used. TCP/IP is a protocol that combines TCP and IP and is used as standard on the Internet and the like.

In communication in TCP, a communication device at the transmission side transmits a data packet, and a communication device at the reception side sends back an acknowledgement (ACK) for the received data packet when the data packet has been normally received. The communication device at the transmission side receives the ACK and transmits the next data packet. In this manner, in communication in TCP, the fact that a data packet has arrived can be confirmed with the reception of the ACK, whereby reliable communication is achieved.

In TCP communication, if ACK transmission increases, communication resources are used for ACK transmission, and the communication speed decreases in some cases. Therefore, as a scheme of reducing the number of ACK transmissions, for example, there is a scheme of discarding ACKs exceeding allocated resources. Furthermore, as a scheme of reducing the number of ACK transmissions, there is a scheme of allowing a predetermined number of ACKs to stay in a transmission buffer and discarding ACKs exceeding the predetermined number.

Technologies relating to LTE and TCP/IP are disclosed in, for example, Japanese Laid-open Patent Publication No. 2005-51738, 3GPP TS36.300, 3GPP TS36.211, 3GPP TS36.212, 3GPP TS36.213, 3GPP TS36.321, 3GPP TS36.322, 3GPP TS36.323, 3GPP TS36.331, 3GPP TS36.413, 3GPP TS36.423, 3GPP TS36.425, 3GPP TR38.912, 3GPP TR38.913, 3GPP TR38.801, 3GPP TR38.802, 3GPP TR38.803, 3GPP TR38.804, 3GPP TR38.900, and the like.

SUMMARY

According to an aspect of the embodiments, a first communication device in a communication systems including the first communication device and the second communication device that performs wireless connection with the first communication device and relays communication with the first communication device, the first communication device includes a receiver configured to receive packets from the second communication device, and a transmitter configured to store reception confirmation packets corresponding to the packets in a buffer, perform transmission at least a portion of the reception confirmation packets stored in the buffer, and discard reception confirmation packets not to be transmitted in the transmission according to a discard ratio.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 7A to 7C are diagrams illustrating examples of the transmission buffer at each timing;

FIGS. 9A and 9B are diagrams illustrating examples of the transmission buffer at each timing;

DESCRIPTION OF EMBODIMENT

A communication device using a scheme of discarding a part of ACKs does not send back an ACK until a plurality of packets are received. For example, a communication device at the packet transmission side sometimes performs control so as not to transmit the next packet until an ACK is received, or the total amount of data to be transmitted reaches a predetermined size or more, or a packet transmission wait timer times out. In a case where the communication device at the transmission side performs such control, if the total amount of transmission data does not reach a predetermined size or more because data to be transmitted is small, the next packet is not allowed to be transmitted until the packet transmission wait timer times out. In this case, data reception is delayed in the communication device at the reception side waiting for the next data packet.

Therefore, one disclosure is to provide a communication device, a communication method, and a communication system that suppress a delay in data transmission and reception even when a scheme of discarding a part of ACKs is applied.

Hereinafter, embodiments will be described in detail with reference to the drawings. Problems and examples in the present specification are merely examples, and do not limit the scope of rights of the present application. For example, as long as the described expressions are technologically equivalent even if different described expressions are used, the technologies of the present application can be applied and the scope of rights is not limited even if the expressions are different.

First Embodiment

Initially, a first embodiment will be described.

A communication system according to the first embodiment includes a first communication device and a second communication device that is wirelessly connected to the first communication device and relays communication with the first communication device. In addition, the first communication device includes a reception unit that receives a packet from the second communication device and accumulates a reception confirmation packet indicating that the packet has been received, in a buffer. Furthermore, the first communication device includes a transmission unit that transmits a part or all of the reception confirmation packets accumulated in the buffer and discards a number of reception confirmation packets equal to the number according to a discard ratio, out of the reception confirmation packets that are not to be transmitted. Moreover, the first communication device includes a determination unit that determines the discard ratio according to the state of wireless connection.

Figure 1:
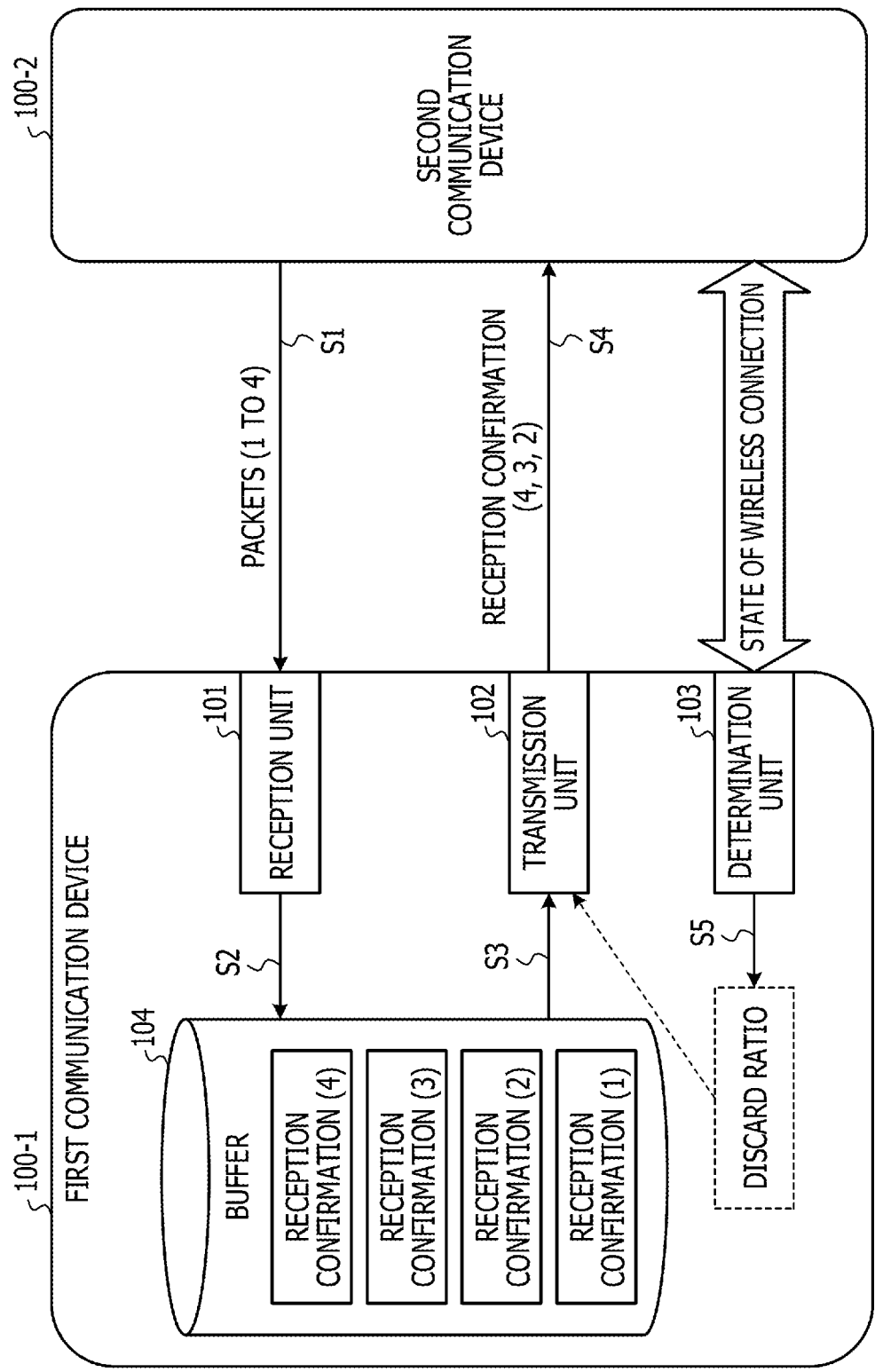
FIG. 1 is a diagram illustrating an exemplary configuration of a communication system according to a first embodiment.

FIG. 1 is a diagram illustrating an exemplary configuration of a communication system 10 according to the first embodiment. The communication system 10 includes communication devices 100-1 and 100-2. The communication devices 100-1 and 100-2 are connected wirelessly and, for example, transmit and receive data using packets. The communication device 100-1 is, for example, a terminal device such as a mobile phone, or a computer such as a server or a host machine. Furthermore, the communication device 100-2 is, for example, a base station device. In addition, the communication device 100-2 may be a device similar to the communication device 100-1, for example.

For example, the communication devices 100-1 and 100-2 communicate with each other based on TCP/IP. Furthermore, the communication devices 100-1 and 100-2 each include a processor, a storage, and a memory (not illustrated), and load a program stored in the storage into the memory such that the processor executes the loaded program, thereby constructing a reception unit 101, a transmission unit 102, and a determination unit 103 to execute each process.

Packets used in the communication system 10 are a packet transmitted by the communication device 100-2 (for example, a TCP packet) and a reception confirmation packet (for example, an ACK). Hereinafter, when simply referred to as a packet, it indicates the TCP packet, or the reception confirmation packet, or both of the packets.

The communication device 100-1 includes the reception unit 101, the transmission unit 102, the determination unit 103, and a buffer 104. The communication device 100-2 may also have a similar configuration (not illustrated).

The reception unit 101 receives a packet from the communication device 100-2, and stores a reception confirmation packet indicating that the packet has been received, in the buffer 104. The buffer 104 is, for example, a transmission buffer.

When a transmission trigger occurs, the transmission unit 102 transmits a part or all of the reception confirmation packets stored in the buffer 104 to the communication device 100-2. Then, the transmission unit 102 discards a number of reception confirmation packet equal to the number according to a discard ratio determined by the determination unit 103, out of remaining reception confirmation packets, which are reception confirmation packets that have not been transmitted and remain in the buffer 104, and transmits the other reception confirmation packets. Hereinafter, a response confirmation packet that is not to be discarded according to the discard ratio but to be transmitted to the communication device 100-2, out of the remaining reception confirmation packets, is sometimes expressed as a packet not to be discarded according to the discard ratio.

The communication device 100-2 transmits a packet to the communication device 100-1. The packet includes an identifier or a sequence number of the packet (hereinafter referred to as a corresponding packet number). The corresponding packet number is, for example, a numerical value that is incremented each time a packet is transmitted, and indicates the packet transmission order. Note that, if a numerical value can calculate the packet transmission order and is uniquely defined for each packet, for example, a numerical value indicating the relationship with data in a packet transmitted at the previous time, such as an beginning address of data to be transmitted, may be used as the corresponding packet number. For example, the communication device 100-2 transmits four packets with corresponding packet numbers 1 to 4 (S1).

When the communication device 100-1 receives the packets from the communication device 100-2 (S1), the reception unit 101 stores the reception confirmation packets in the buffer 104 (S2). For example, when receiving a packet (1) (meaning a packet whose corresponding packet number is 1; hereinafter described similarly), the reception unit 101 creates a reception confirmation packet (1) (meaning a reception confirmation packet whose corresponding packet number is 1, and also described as ACK (1) and reception confirmation (1); hereinafter, described similarly), and stores the created reception confirmation packet (1) in the buffer 104. Each time the reception unit 101 receives a packet, the reception unit 101 creates a corresponding reception confirmation packet and stores the created reception confirmation packet in the buffer 104. Accordingly, the reception confirmation packets (1) to (4) are stored in the buffer 104.

Next, when a packet transmission trigger occurs, the transmission unit 102 extracts a part of the reception confirmation packets stored in the transmission buffer (S3) and transmits the extracted part of the reception confirmation packets to the communication device 100-2 (S4). The transmission trigger occurs asynchronously with the reception of a packet, for example, when a packet transmission wait timer times out, when packets are stored in the transmission buffer up to a predetermined size, or when a base station device (for example, the communication device 100-2) gives uplink transmission permission (UL Grant) to a mobile terminal device (for example, the communication device 100-1).

In the example in FIG. 1, the communication device 100-1 transmits the reception confirmation packets (4) and (3) as a part of the reception confirmation packets. The number of reception confirmation packets to be transmitted may be one or more than one. For example, the communication device 100-1 determines the number of packets according to the amount of resources of wireless resources allocated for transmitting reception confirmation packets, as the number of reception confirmation packets to be transmitted.

The communication device 100-1 transmits, to the communication device 100-2, a packet not to be discarded according to the discard ratio, out of the reception confirmation packets other than the transmitted part of the reception confirmation packets. The discard ratio indicates the proportion of packets to be discarded without being transmitted to the communication device 100-2, to the remaining reception confirmation packets. FIG. 1 is an example of a case where the discard ratio is 0.5, for example. In this case, the communication device 100-1 discards one packet (the reception confirmation (1) in FIG. 1) corresponding to the discard ratio 0.5 out of the two remaining reception confirmation packets, and the remaining one packet (the reception confirmation (2) in FIG. 1) is transmitted to the communication device 100-2. For example, the reception confirmation packets to be transmitted to the communication device 100-2 are the reception confirmations (4), (3), and (2).

The communication device 100-1 discards a reception confirmation packet other than the transmitted part of the reception confirmation packets and a number of reception confirmation packets equal to the number according to the discard ratio, from the buffer without waiting for the next transmission trigger to occur, and does not transmit the discarded reception confirmation packet to the communication device 100-2. Note that, here, for the sake of simplicity of explanation, a reception confirmation packet corresponding to a packet (x) is described as reception confirmation (x). In TCP communication, however, for example, information regarding the next packet to be received is sometimes included in the reception confirmation (ACK). Accordingly, the reception confirmation corresponding to the packet (x) is given as reception confirmation (x+1) in some cases. The same applies to the reception confirmation (ACK) in the following description.

The determination unit 103 determines the discard ratio according to the state of wireless connection (S5). For example, when communication is performed, the determination unit 103 changes the discard ratio by 0.01 every unit time to acquire the throughput and the number of transmissions of reception confirmation packets for each discard ratio as the state of wireless connection, and stores the acquired information in an internal memory. Furthermore, for example, the determination unit 103 may acquire, for each discard ratio, the requested amount of resources requested by the communication device 100-1 and the allocated amount of resources allocated to the communication device 100-1 by the communication device 100-2, as the state of wireless connection.

Then, the determination unit 103 determines the discard ratio according to the state of wireless connection. The determination unit determines, for example, a discard ratio at which the highest throughput is obtained, or a discard ratio at which the throughput is equal to or higher than a threshold and at the same time the largest number of transmissions of reception confirmation packets is obtained, as the discard ratio used for wireless communication. Furthermore, the determination unit 103 may determine, for example, a discard ratio at which the requested amount of resources and the allocated amount of resources match, or a discard ratio near the discard ratio at which the requested amount of resources and the allocated amount of resources match, as the discard ratio used for wireless communication.

In the first embodiment, the first communication device does not send back reception confirmation packets for all received packets, but sends back reception confirmation packets for a part of the reception packets. Moreover, the first communication device transmits a reception confirmation packet other than the reception confirmation packet to be discarded according to the discard ratio, in addition to the reception confirmation packets for a part of the reception packets. The discard ratio is determined according to the state of wireless communication.

Consequently, the first communication device may perform communication in which data transmission and reception are not delayed, for example, by setting a discard ratio according to the wireless connection state.

Second Embodiment

Next, a second embodiment will be described.

<Exemplary Configuration of Communication System>

Figure 2:
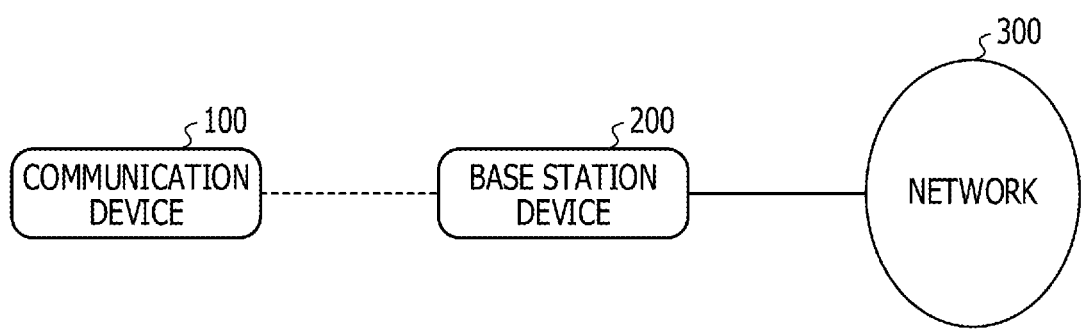
FIG. 2 is a diagram illustrating an exemplary configuration of a communication system 10.

FIG. 2 is a diagram illustrating an exemplary configuration of the communication system 10. The communication system 10 includes a communication device 100, a base station device 200, and a network 300. The communication system 10 is a communication system that supports, for example, long term evolution (LTE) communication guidelines.

The communication device 100 is, for example, a mobile terminal or a computer. For example, the communication device 100 is wirelessly connected to the base station device 200 and communicates with the network 300 via the base station device 200. The communication device 100, for example, downloads data or receives a service from the base station device 200 or the network 300. Furthermore, the communication device 100 communicates with the base station device 200 and the network 300 based on, for example, TCP/IP.

The base station device 200 is a packet relay device that relays packets transmitted and received by the communication device 100. The base station device 200 is a base station device such as an evolved Node B (eNodeB) in LTE, for example. Furthermore, the base station device 200 may be a piece of network equipment such as a switch or a router.

The network 300 may be, for example, the Internet or an intranet constituted by a dedicated line.

<Exemplary Configuration of Communication Device>

Figure 3:
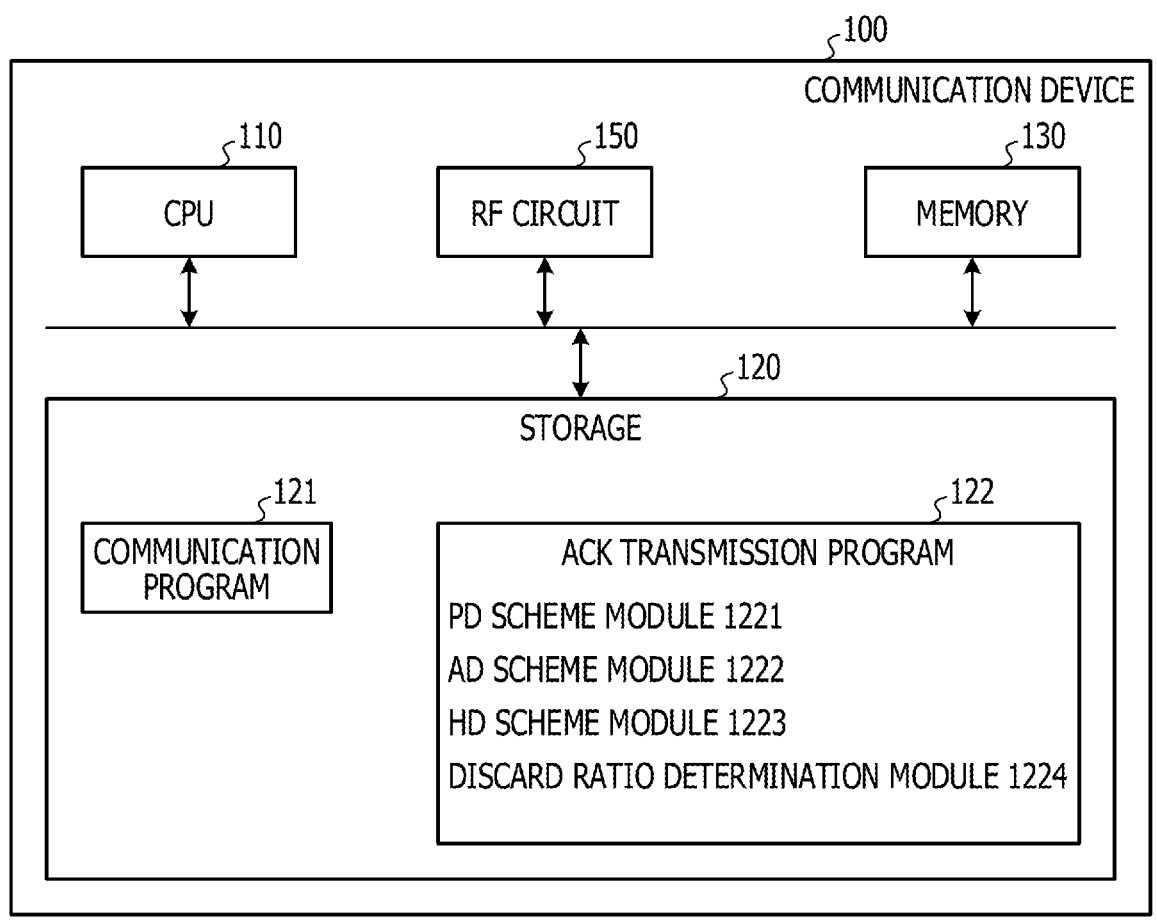
FIG. 3 is a diagram illustrating an exemplary configuration of a communication device 100.

FIG. 3 is a diagram illustrating an exemplary configuration of the communication device 100. The communication device 100 includes a central processing unit (CPU) 110, a storage 120, a memory 130, and a radio frequency (RF) circuit 150.

The storage 120 is an auxiliary storage device that stores programs and data, such as a flash memory, a hard disk drive (HDD), or a solid state drive (SSD). The storage 120 stores a communication program 121 and an ACK transmission program 122.

The memory 130 is an area in which a program stored in the storage 120 is loaded. The memory 130 is also used as an area in which the program stores data.

The RF circuit 150 is a device wirelessly connected to the base station device 200. The RF circuit 150 includes, for example, an antenna, and transmits and receives radio waves (packets) to and from the base station device 200 via the antenna.

The CPU 110 is a processor that loads a program stored in the storage 120 into the memory 130 and executes the loaded program to implement each item of processing.

The CPU 110 performs communication processing by executing the communication program 121. The communication processing is processing for communicating with the base station device 200, the network 300, and the like. For example, the communication device 100 performs the communication processing when performing communication in response to a request by a user of the communication device 100 or a program executed in the communication device 100.

Furthermore, the CPU 110 constructs a reception unit, a transmission unit, and a determination unit to perform ACK transmission processing, by executing the ACK transmission program 122. The ACK transmission processing is processing for generating an ACK (response confirmation) for a packet received from the base station device 200 to store the generated ACK in a transmission buffer, and transmitting the ACK to the base station device 200 according to an ACK transmission scheme.

The CPU 110 executes a passive discard (PD) scheme module 1221 included in the ACK transmission program 122 to construct the reception unit and the transmission unit and perform the ACK transmission processing in accordance with the PD scheme. The PD scheme is an ACK transmission scheme in which a number of ACKs equal to the number according to the allocated amount of resources are transmitted, a number of ACKs equal to the number according to the discard ratio are discarded out of ACKs that have not been transmitted, and the other ACKs are transmitted. For example, in the PD scheme, the number of ACKs to be transmitted from the communication device 100 is obtained by totaling the number of ACKs according to the allocated amount of resources and the number of ACKs not to be discarded according to the discard ratio.

The CPU 110 executes an active discard (AD) scheme module 1222 included in the ACK transmission program 122 to construct the reception unit and the transmission unit and perform the ACK transmission processing in accordance with the AD scheme. The AD scheme is an ACK transmission scheme in which a number of ACKs is accumulated in the transmission buffer up to an accumulation threshold, and ACKs exceeding the accumulation threshold are discarded according to the discard ratio. For example, in the AD discard ratio scheme, the number of ACKs to be transmitted from the communication device 100 is obtained by totaling the number of ACKs equal to the accumulation threshold and the number of ACKs not to be discarded according to the discard ratio.

The CPU 110 executes a hybrid discard (HD) scheme module 1223 included in the ACK transmission program 122 to construct the reception unit and the transmission unit and perform the ACK transmission processing in accordance with the HD scheme. The HD scheme is an ACK transmission scheme that simultaneously executes both of the AD scheme and the PD scheme. For example, in the HD scheme, the number of ACKs to be transmitted from the communication device 100 is obtained by totaling the number of ACKs according to the allocated amount of resources or equal to the accumulation threshold, and the number of ACKs not to be discarded according to the discard ratio.

The CPU 110 executes a discard ratio determination module 1224 included in the ACK transmission program 122 to construct a determination unit and perform discard ratio determination processing. The discard ratio determination processing is processing for determining the discard ratio used in each ACK transmission scheme.

Note that each of the PD scheme, AD scheme, and HD scheme is transmission number determination processing for determining the number of ACKs to be transmitted in the processing of transmitting a part or all of the ACKs accumulated in the transmission buffer.

<ACK Transmission Processing by PD Scheme>

Figure 4:
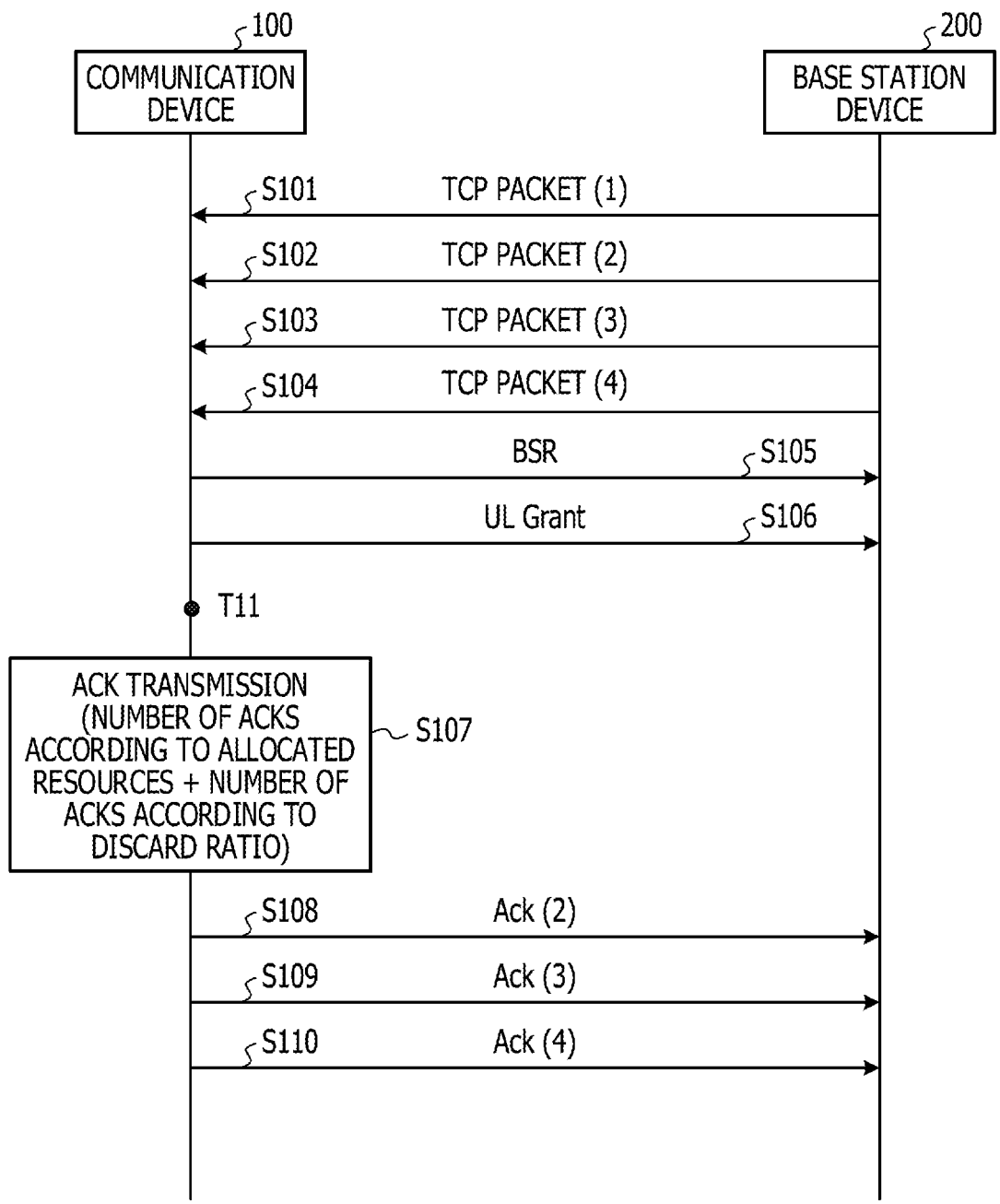
FIG. 4 is a diagram illustrating an example of a sequence of ACK transmission processing by a passive discard (PD) scheme.

FIG. 4 is a diagram illustrating an example of a sequence of the ACK transmission processing by the PD scheme. The communication device 100 receives TCP packets (1) to (4) from the base station device 200 (S101 to S104). Then, when an ACK transmission trigger occurs, the communication device 100 transmits a buffer status report (BSR) (S105). The BSR is, for example, a message with which the communication device 100 requests the base station device 200 for the allocation of wireless resources for transmitting a packet (including the ACK and the TCP packet).

Upon receiving the BSR, the base station device 200 transmits uplink grant (UL_Grant) to the communication device 100 (S106). UL_Grant is, for example, a message including the amount of wireless resources allocated to the communication device 100.

Upon receiving UL_Grant, the communication device 100 transmits, to the base station device 200, a number of ACKs equal to the number obtained by totaling the number of ACKs according to the allocated amount of resources and the number of ACKs not to be discarded according to the discard ratio (S107). The number of ACKs not to be discarded according to the discard ratio is a number obtained by subtracting the number of ACKs to be discarded according to the discard ratio from the number of remaining ACKs. In FIG. 4, ACKs (2) to (4) are transmitted (S108 to S110).

Figure 5:
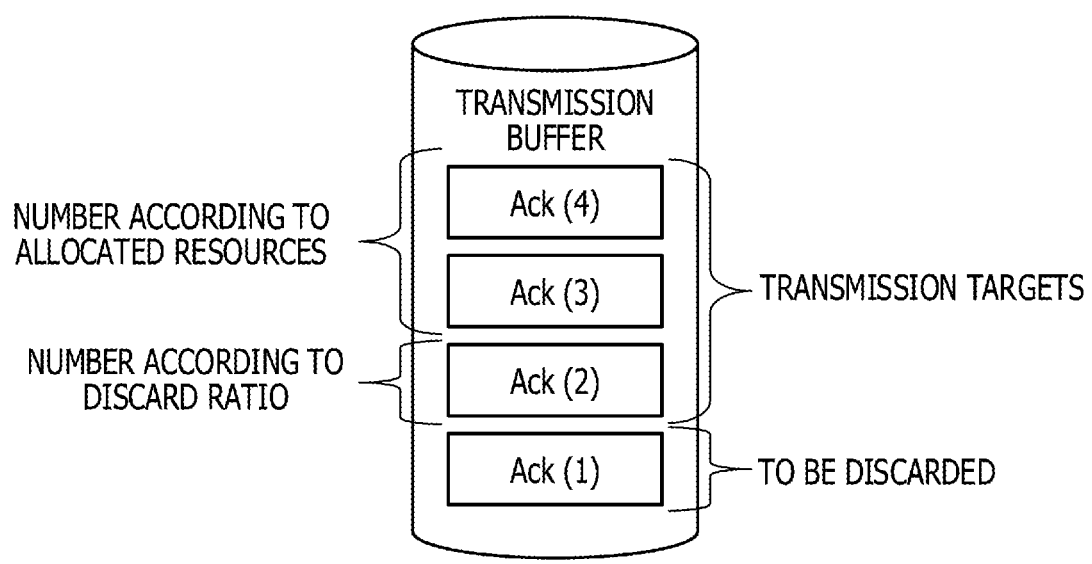
FIG. 5 is a diagram illustrating an example of a transmission buffer at timing T11 in FIG. 4.

FIG. 5 is a diagram illustrating an example of the transmission buffer at timing T11 in FIG. 4. In the transmission buffer of the communication device 100, ACKs (1) to (4) are accumulated. For example, the communication device 100 calculates the number according to the allocated amount of resources as two, and assigns the ACKs (4) and (3) as transmission targets in the descending order of reception. Then, one packet, which is the number according to the discard ratio, is discarded out of the ACKs (1) and (2) remaining in the transmission buffer. At this time, the communication device 100 determines a packet to be discarded in the ascending order of reception. The communication device 100 determines the ACK (1) as a packet to be discarded, and assigns the remaining ACK (2) as a transmission target. For example, the communication device 100 assigns the ACKs (4), (3), and (2) as transmission targets.

In the PD scheme, the communication device 100 transmits, for example, a number of ACKs equal to the number according to the allocated amount of resources. Then, the communication device 100 discards a number of ACKs equal to the number according to the discard ratio, out of the ACKs that have not been transmitted, and transmits ACKs other than the discarded ACKs.

<ACK Transmission Processing by AD Scheme>

Figure 6:
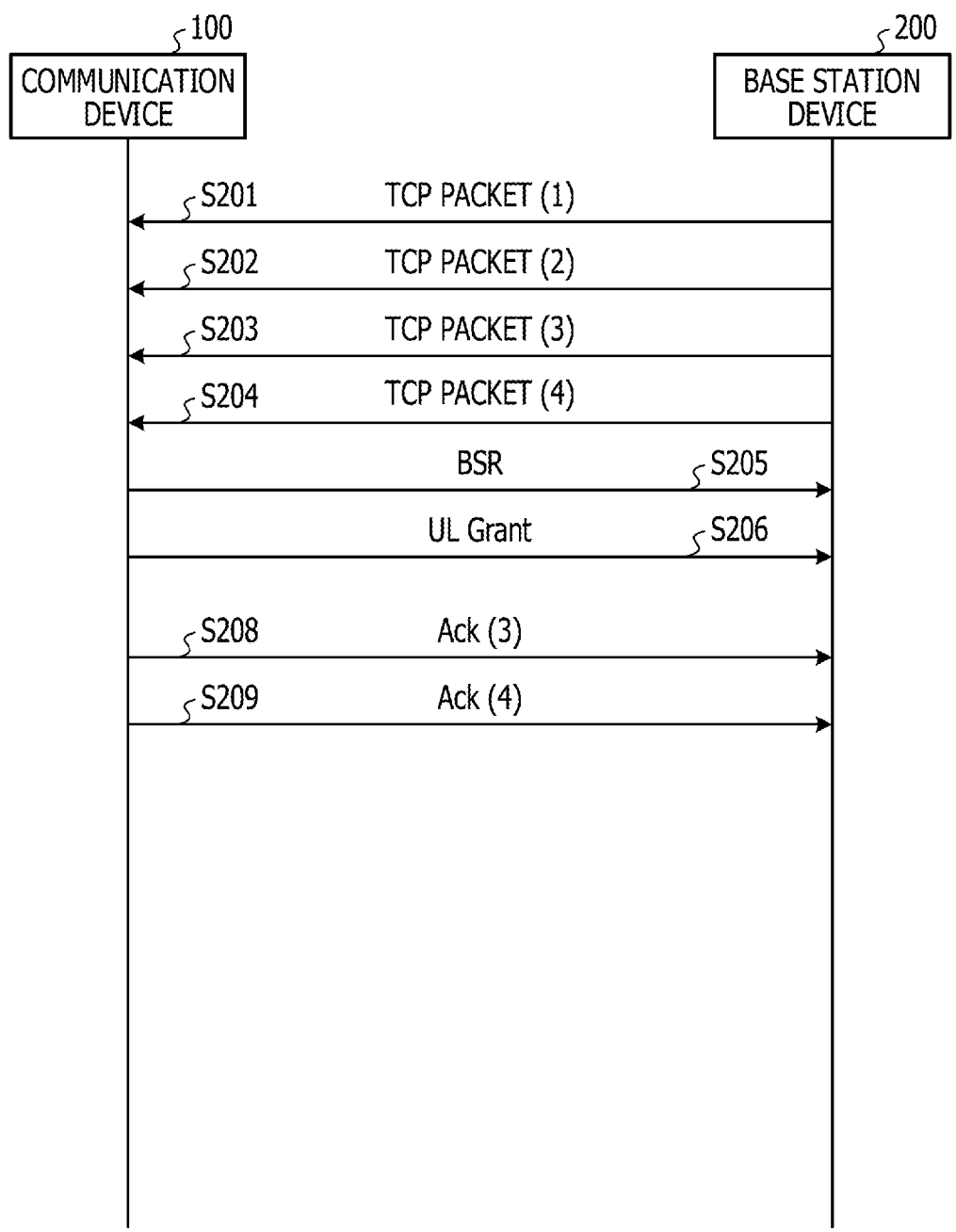
FIG. 6 is a diagram illustrating an example of a sequence of ACK transmission processing by an active discard (AD) scheme.

FIG. 6 is a diagram illustrating an example of a sequence of the ACK transmission processing by the AD scheme. The communication device 100 receives TCP packets (1) and (2) from the base station device 200 (S201 and S202).

FIGS. 7A to 7C are diagrams illustrating examples of the transmission buffer at each timing. FIG. 7A is a diagram illustrating an example of the transmission buffer at timing T21 in the sequence in FIG. 6. At timing T21, ACKs (1) and (2) for the received TCP packets (1) and (2) are accumulated in the transmission buffer.

Returning to the sequence in FIG. 6, the communication device 100 receives a TCP packet (3) (S203).

FIG. 7B is a diagram illustrating an example of the transmission buffer at timing T22 in the sequence in FIG. 6. At timing T22, an ACK (3) corresponding to the received TCP packet (3) is accumulated in the transmission buffer in addition to the ACKs (1) and (2). However, for example, in a case where the accumulation threshold for accumulating ACKs is two, an ACK exceeding two is to be discarded. For this reason, in FIG. 7B, for example, the communication device 100 discards the ACK (1), which is the oldest ACK among the ACKs.

Returning to the sequence in FIG. 6, the communication device 100 receives a TCP packet (4) (S204).

FIG. 7C is a diagram illustrating an example of the transmission buffer at timing T23 in the sequence in FIG. 6. At timing T23, an ACK (4) corresponding to the received TCP packet (4) is accumulated in the transmission buffer in addition to the ACKs (2) and (3). The communication device 100 discards the ACK (2) exceeding the accumulation threshold for accumulating ACKs, namely, two.

Returning to the sequence in FIG. 6, when an ACK transmission trigger occurs, the communication device 100 transmits a BSR (S205). Then, upon receiving UL_Grant (S206), the communication device 100 transmits the ACKs (3) and (4) accumulated in the transmission buffer to the base station device 200 (S208 and S209). In the AD scheme, for example, the communication device 100 accumulates a number of ACKs equal to the number according to the accumulation threshold in the transmission buffer, and transmits the accumulated ACKs at the ACK transmission timing.

Note that, in the AD scheme, the discard ratio may be converted into a rate. As a specific example, the discard ratio may be calculated using following formula (1).

$$DR = 1 - T/100 \quad \text{Formula (1)}$$

DR denotes the discard ratio and T denotes the accumulation threshold. For example, when a simulation is performed using T=100, it can be seen that only a few ACKs are discarded, that is, the discard ratio approximates zero. Meanwhile, for example, when a simulation is performed using T=1, it can be seen that many ACKs are discarded and the discard ratio approximates one. The discard ratio in the AD scheme may be determined according to the accumulation threshold as indicated by formula (1).

Furthermore, for example, the communication device 100 may discard an ACK not to be transmitted in the AD scheme, according to the discard ratio. For example, the communication device 100 may discard only a number of ACKs equal to the number according to the discard ratio out of the ACKs (1) and (2), which are discarded in FIGS. 7A to 7C, so as to transmit an ACK not to be discarded to the base station device 200. For example, when the discard ratio is 0.5, one packet (for example, the ACK (1)) may be discarded out of the two packets, namely, the ACKs (1) and (2) such that the remaining one packet (for example, the ACK (2)) is transmitted to the base station device 200. Hereinafter, this scheme is referred to as an AD discard ratio scheme in some cases. Note that the AD scheme in the following description can be replaced with the AD discard ratio scheme.

<ACK Transmission Processing by HD Scheme>

Figure 8:
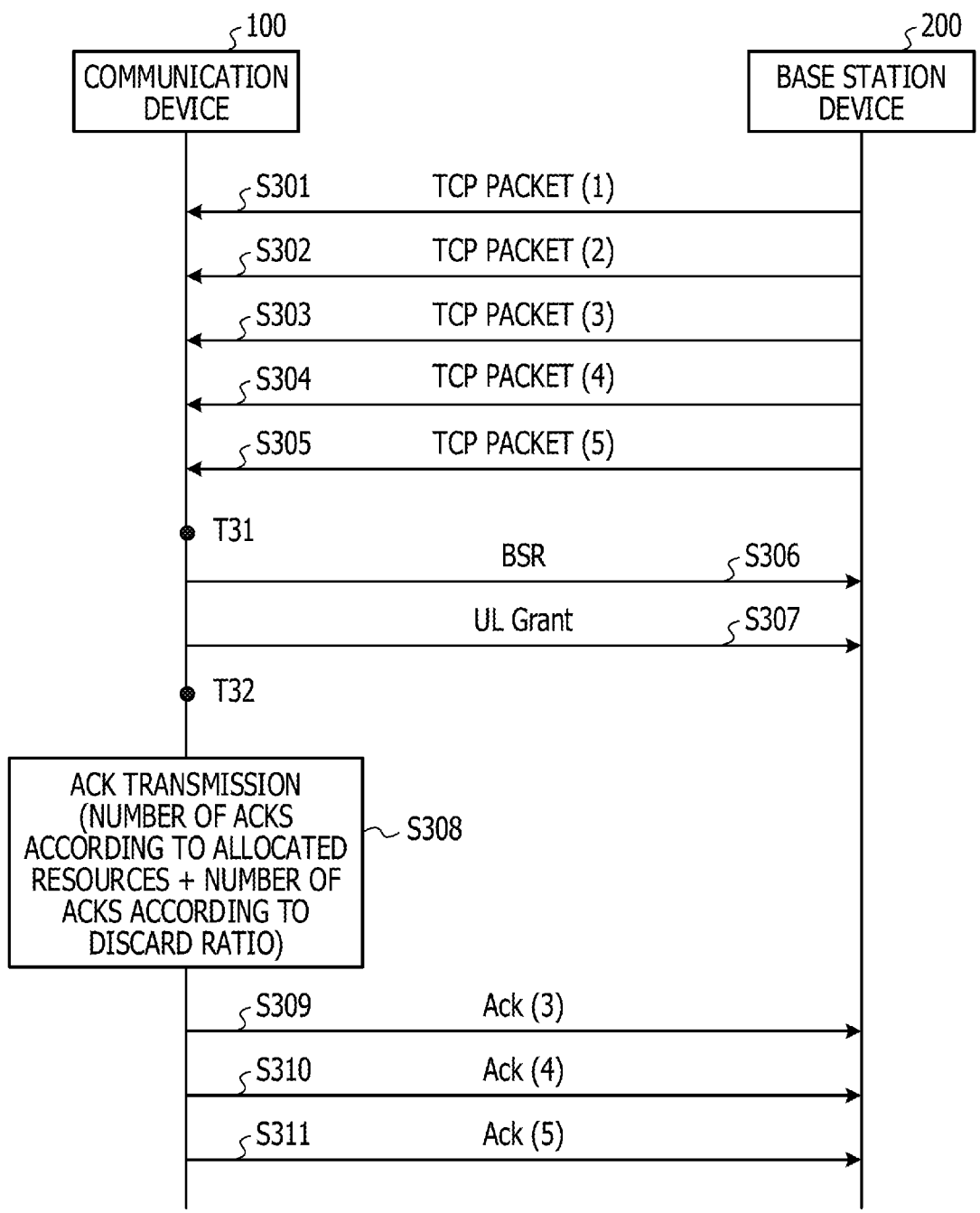
FIG. 8 is a diagram illustrating an example of a sequence of ACK transmission processing by a hybrid discard (HD) scheme.

FIG. 8 is a diagram illustrating an example of a sequence of the ACK transmission processing by the HD scheme. The communication device 100 receives TCP packets (1) to (5) from the base station device 200 (S301 to S305). The HD scheme is a scheme that simultaneously executes both of the AD scheme and the PD scheme described above.

FIGS. 9A and 9B are diagrams illustrating examples of the transmission buffer at each timing. FIG. 9A is a diagram illustrating an example of the transmission buffer at timing T31 in the sequence in FIG. 8. At timing T31, ACKs (1) to (5) for the received TCP packets (1) to (5) are accumulated in the transmission buffer.

Here, the communication device 100 discards ACKs exceeding the accumulation threshold (for example, four) according to the discard ratio by the AD scheme. In FIG. 9A, the communication device 100 discards the ACK (1) according to the discard ratio, for example.

Returning to the sequence in FIG. 8, when an ACK transmission trigger occurs, the communication device 100 transmits a BSR (S306) and receives UL_Grant from the base station device 200 (S307).

FIG. 9B is a diagram illustrating an example of the transmission buffer at timing T32 in the sequence in FIG. 8. At timing T32, the ACKs (2) to (5) are accumulated in the transmission buffer.

The communication device 100 assigns a number of ACKs equal to the number according to the allocated amount of resources (the ACKs (4) and (5) in FIG. 9B) as transmission targets by the PD scheme. Then, the communication device 100 discards a number of ACKs equal to the number according to the discard ratio (the ACK (2) in FIG. 9B), out of ACKs other than the transmission targets (the ACKs (3) and (2) in FIG. 9B), and assigns an ACK not to be discarded (the ACK (3) in FIG. 9B) as a transmission target.

In the HD scheme, the communication device 100 discards ACKs serving as discard candidates other than ACKs assigned as transmission targets on the basis of the accumulation threshold and the allocated amount of resources, according to the discard ratio.

<Discard Ratio Determination Processing>

The discard ratio determination processing performed by the communication device 100 will be described below. In the discard ratio determination processing, the communication device 100 uses the state of wireless connection as a metric, including the throughput, the number of ACK transmissions, the requested amount of resources, and the allocated amount of resources. Furthermore, the communication device 100 sometimes determines the ACK transmission scheme as well according to the state of the wireless connection in the discard ratio determination processing. Hereinafter, four examples of the discard ratio determination processing will be illustrated and each will be described.

<1. First Discard Ratio Determination Processing>

The first discard ratio determination processing is processing for determining the discard ratio based on the throughput and the number of ACK transmissions. Furthermore, the first discard ratio determination processing is processing for determining the discard ratio when a certain ACK transmission scheme is selected, and any scheme may be selected as the ACK transmission scheme.

Figure 10A:
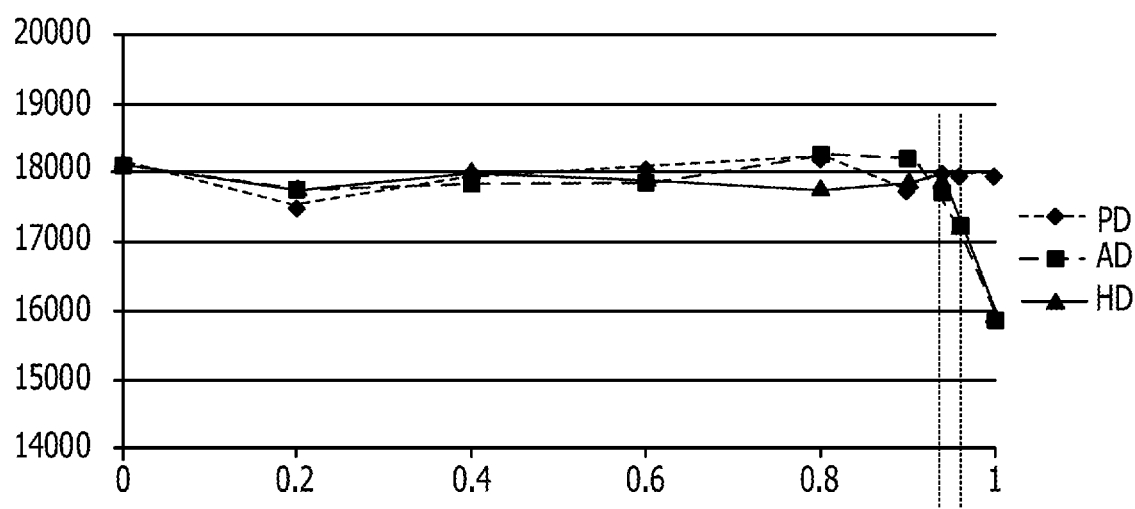
FIGS. 10A and 10B are diagrams illustrating examples of graphs of throughput and the number of ACK transmissions for each ACK transmission scheme.
Figure 10B:
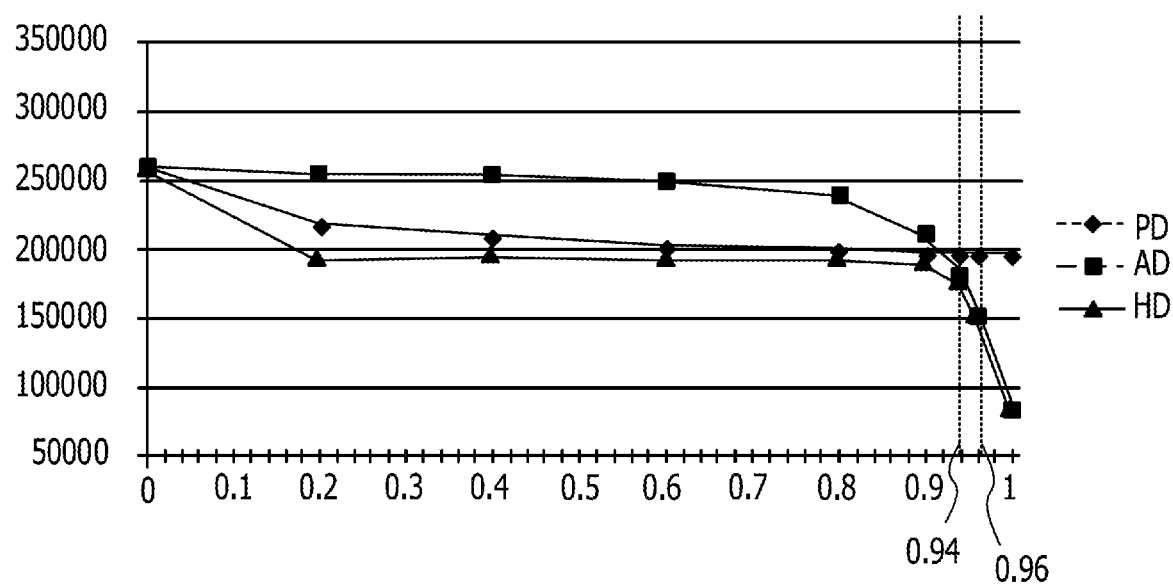

FIGS. 10A and 10B are diagrams illustrating examples of graphs of throughput and the number of ACK transmissions for each ACK transmission scheme. The throughput and the number of ACK transmissions are, for example, numerical values indicating the state of wireless connection between the communication device 100 and the base station device 200. Note that, while the throughput illustrated in FIG. 10A represents throughput in a direction from the base station device 200 to the communication device 100 (downlink direction), the communication device 100 may use throughput in a direction from the communication device 100 to the base station device 200 (uplink direction).

For example, during the operation of the communication system 10, the communication device 100 changes the ACK transmission scheme and the discard ratio to measure the throughput and the number of ACK transmissions. Alternatively, for example, the communication device 100 may execute a simulation before being installed in the communication system 10 to acquire the throughput and the number of ACK transmissions.

In FIG. 10A, the vertical axis represents the throughput and the horizontal axis represents the discard ratio. The unit of throughput is Kbit per second (Kb/s). Furthermore, in FIG. 10B, the vertical axis represents the number of ACK transmissions (Num of TCP ACKs), and the horizontal axis represents the discard ratio.

Figure 11:
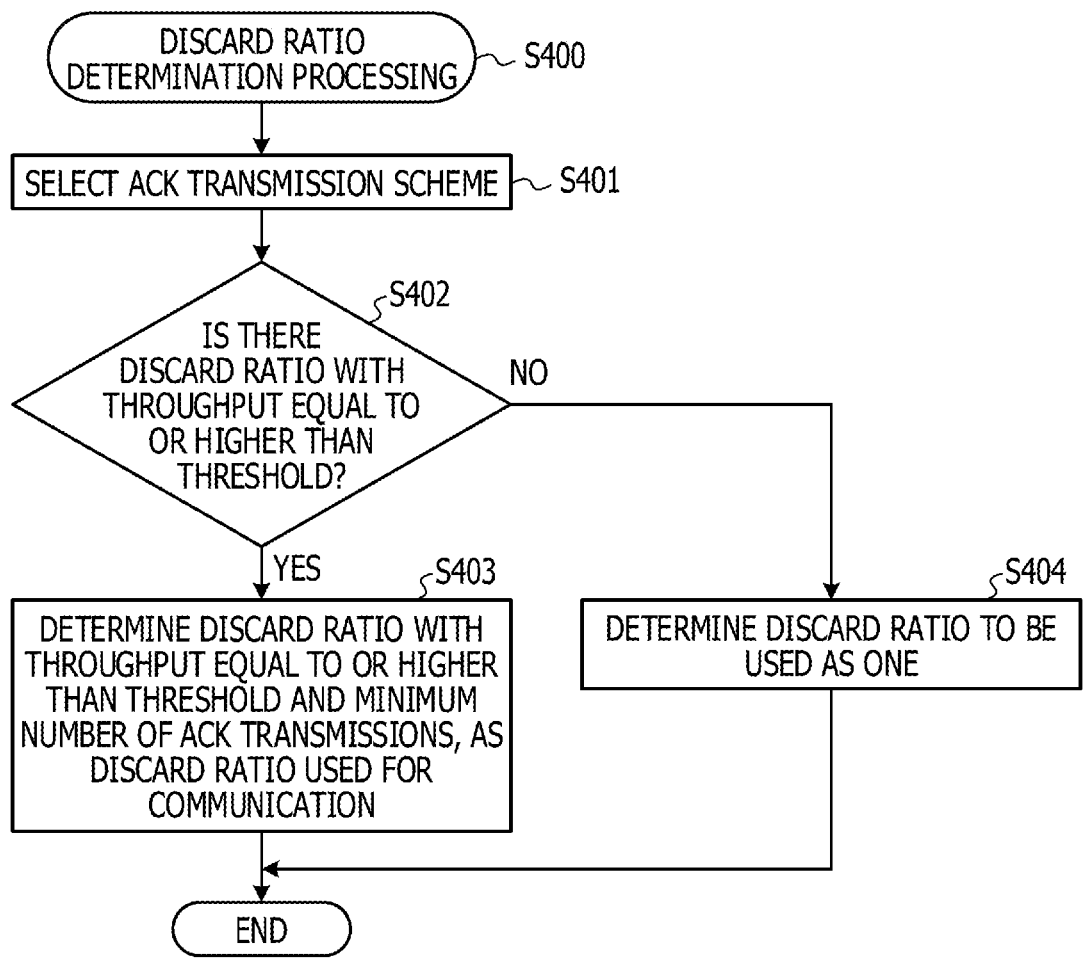
FIG. 11 is a diagram illustrating an example of a process flowchart of discard ratio determination processing.

FIG. 11 is a diagram illustrating an example of a process flowchart of the discard ratio determination processing. The communication device 100 selects an ACK transmission scheme (S401). The communication device 100 confirms whether or not there is a discard ratio with a throughput equal to or higher than a threshold (first threshold) in the selected ACK transmission scheme (S402).

In a case where there is a discard ratio with a throughput equal to or higher than the threshold (Yes in S402), the communication device 100 determines a discard ratio with a throughput equal to or higher than the threshold and the minimum number of ACK transmissions, as the discard ratio used for communication (S403). For example, the communication device 100 uses, for communication, a discard ratio with the minimum number of ACK transmissions among discard ratios with a throughput equal to or higher than the threshold.

On the other hand, in a case where there is no discard ratio with a throughput equal to or higher than the threshold (No in S402), the communication device 100 determines the discard ratio to be used as one (S404). Note that the value one used as the discard ratio is a specified value (default value) and, for example, is a numerical value stored in the internal memory. Furthermore, as processing in a case where there is no discard ratio with a throughput equal to or higher than the threshold, the communication device 100 may assign, for example, a discard ratio with the maximum throughput or a discard ratio with the minimum number of ACK transmissions, as the discard ratio used for communication.

Hereinafter, the discard ratio determination processing will be described using as an example a case where the communication device 100 selects the HD scheme. Note that the throughput threshold is assumed, for example, as 175000 Kb/s.

The communication device 100 ascertains, from FIG. 10A, that there is a discard ratio with a throughput equal to or higher than the threshold in the HD scheme (Yes in S402 in FIG. 11). For example, in the HD scheme in FIG. 10A, the throughput exceeds the threshold between the discard ratios 0 and 0.94. Note that, when determining the discard ratio, for example, the communication device 100 determines the discard ratio in increments of 0.02. In FIG. 10A, for example, although the throughput exceeds the threshold also at the discard ratio 0.95, the discard ratio 0.95 is a numerical value not determined as the discard ratio. Thus, the communication device 100 ascertains that the discard ratios from 0 to 0.94 are in a range where the throughput exceeds the threshold.

Then, the communication device 100 determines a discard ratio with a throughput equal to or higher than the threshold and the minimum number of ACK transmissions, as the discard ratio used for communication (S403 in FIG. 11). The communication device 100 determines, from FIG. 10B, the discard ratio 0.94 with the minimum number of ACK transmissions between the discard ratios 0 and 0.94, as the discard ratio used for communication.

Consequently, the communication device 100 may transmit an ACK at a discard ratio with the minimum number of ACK transmissions while maintaining a predetermined throughput or higher in each ACK transmission scheme.

<2. Second Discard Ratio Determination Processing>

The second discard ratio determination processing is processing that uses the logic of the first discard ratio determination processing to also determine the ACK transmission scheme.

Figure 12:
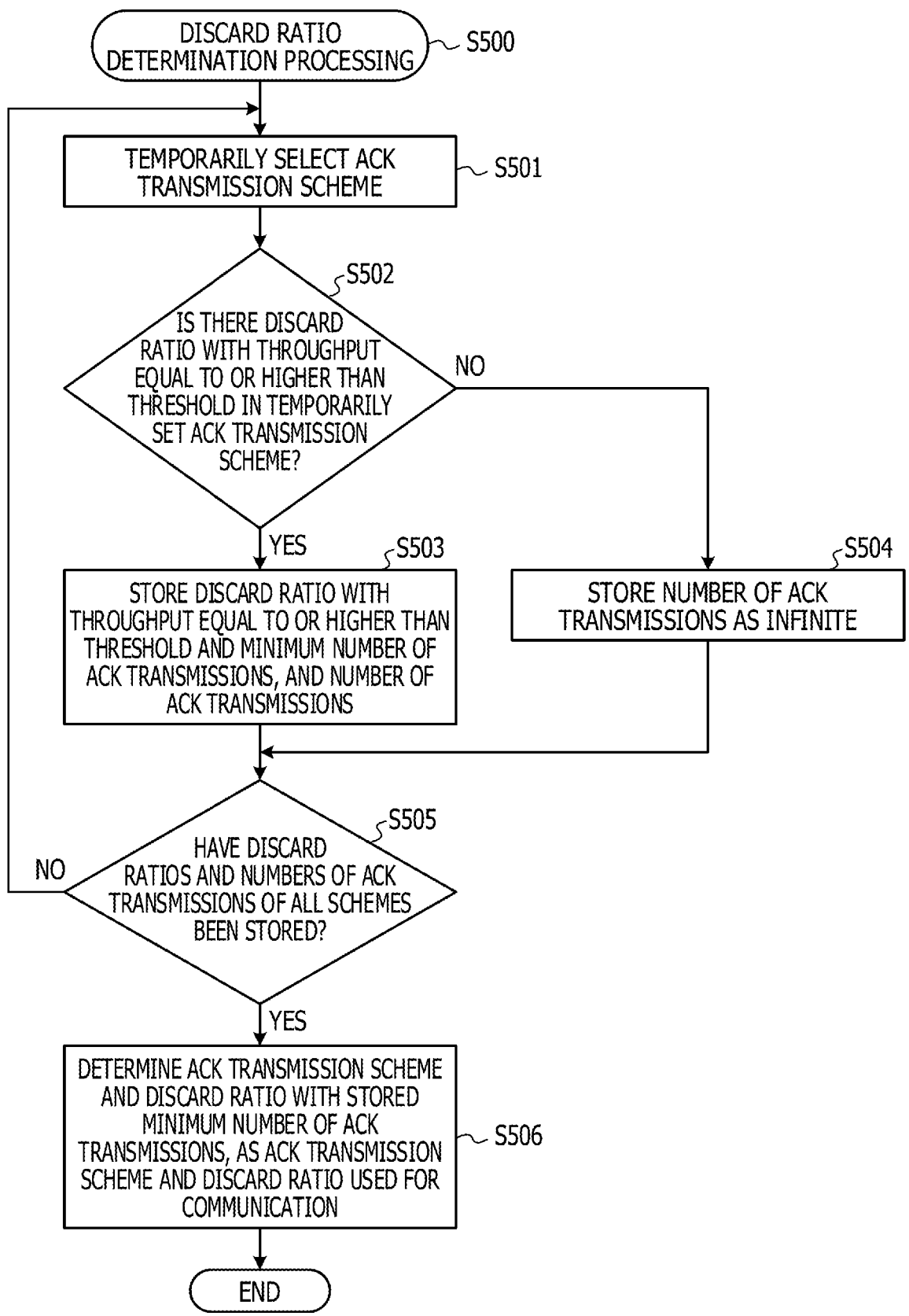
FIG. 12 is a diagram illustrating an example of a process flowchart of discard ratio determination processing.

FIG. 12 is a diagram illustrating an example of a process flowchart of the discard ratio determination processing. The communication device 100 temporarily selects an ACK transmission scheme (S501). The communication device 100 confirms whether or not there is a discard ratio with a throughput equal to or higher than the threshold in the temporarily selected ACK transmission scheme (S502).

In a case where there is a discard ratio with a throughput equal to or higher than the threshold (Yes in S502), the communication device 100 stores, in the internal memory, a discard ratio with a throughput equal to or higher than the threshold and the minimum number of ACK transmissions, and the number of ACK transmissions (S503).

On the other hand, in a case where there is no discard ratio with a throughput equal to or higher than the threshold (No in S502), the communication device 100 stores the number of ACK transmissions as infinite in the internal memory (S504). Note that the reason why the number of ACK transmissions is stored as infinite is to restrain the selection of an ACK transmission scheme not having a discard ratio with a throughput equal to or higher than the threshold, in processing S506 described below.

The communication device 100 confirms whether or not the discard ratios and the numbers of ACK transmissions of all ACK transmission schemes have been stored in the internal memory (S505). Then, in a case where the discard ratios and the numbers of ACK transmissions of all ACK transmission schemes have not been stored (No in S505), an ACK transmission scheme that has not been temporarily selected is temporarily selected, and processing S502 to processing S505 are performed.

On the other hand, in a case where the discard ratios and the numbers of ACK transmissions of all ACK transmission schemes have been stored in the internal memory (Yes in S505), the communication device 100 determines an ACK transmission scheme and discard ratio with the stored minimum number of ACK transmissions, as the ACK transmission scheme and the discard ratio used for communication (S506).

Hereinafter, the discard ratio determination processing will be described using the state of the wireless connection in FIGS. 10A and 10B as an example. Note that the throughput threshold is assumed as 175000 Kb/s.

The communication device 100 temporarily selects the PD scheme as the ACK transmission scheme (S501 in FIG. 12). Then, the communication device 100 ascertains that there is a discard ratio with a throughput equal to or higher than the threshold in the PD scheme (Yes in S502 in FIG. 12). Thereafter, the communication device 100 stores the discard ratio 0.9 and the number of ACK transmissions 140570, which have a throughput equal to or higher than the threshold and the minimum number of ACK transmissions in the PD scheme.

Similarly to the PD scheme, the communication device 100 temporarily selects the AD scheme and the HD scheme, and stores the discard ratios and the numbers of ACK transmissions for the respective schemes. In the AD scheme, the discard ratio is 0.94, and the number of ACK transmissions is 129977. Furthermore, in the HD scheme, the discard ratio is 0.94, and the number of ACK transmissions is 125452.

When the discard ratios and the numbers of ACK transmissions have been stored for all schemes (Yes in S505 in FIG. 12), the communication device 100 determines the ACK transmission scheme and the discard ratio (S506 in FIG. 12). As described above, the numbers of ACK transmissions of the PD scheme, AD scheme, and HD scheme are 140570, 129977, and 125452, respectively, and the HD scheme has the minimum number of ACK transmissions. Thus, the communication device 100 determines to transmit an ACK using the discard ratio 0.94 in the HD scheme.

Consequently, the communication device 100 may select an ACK transmission scheme and a discard ratio with the minimum number of ACK transmissions while maintaining a predetermined throughput or higher.

<3. Third Discard Ratio Determination Processing>

The third discard ratio determination processing is processing for determining the discard ratio based on the requested amount of resources and the allocated amount of resources. The requested amount of resources and the allocated amount of resources are, for example, numerical values indicating the state of wireless connection between the communication device 100 and the base station device 200.

For example, during the actual operation of the communication system 10, the communication device 100 changes the ACK transmission scheme and the discard ratio to measure the requested amount of resources and the allocated amount of resources. Alternatively, for example, the communication device 100 may execute a simulation before being installed in the communication system 10 to acquire the requested amount of resources and the allocated amount of resources.

Figure 13:
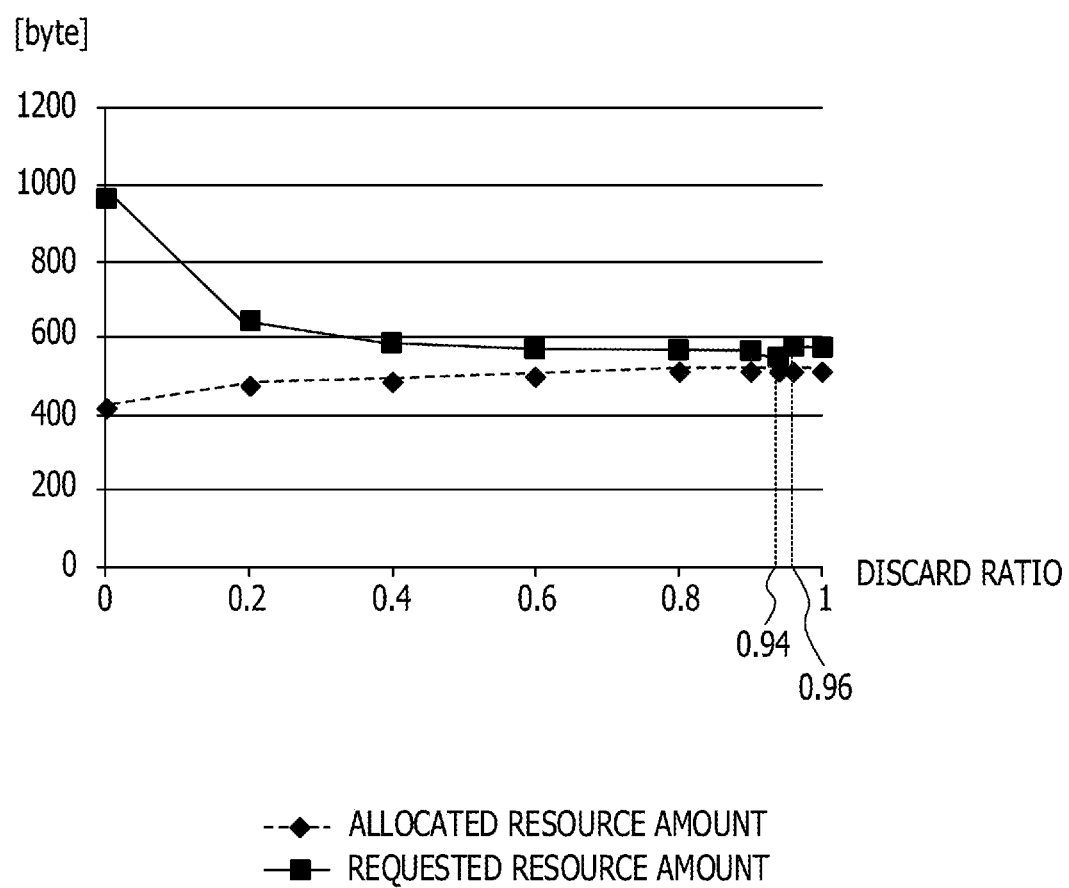
FIG. 13 is a diagram illustrating an example of a graph of a requested amount of resources and an allocated amount of resources in the PD scheme.

FIG. 13 is a diagram illustrating an example of a graph of the requested amount of resources and the allocated amount of resources in the PD scheme. In FIG. 13, the vertical axis represents the requested amount of resources or the allocated amount of resources, and the horizontal axis represents the discard ratio. The unit of the requested amount of resources and the allocated amount of resources is byte.

Figure 14:
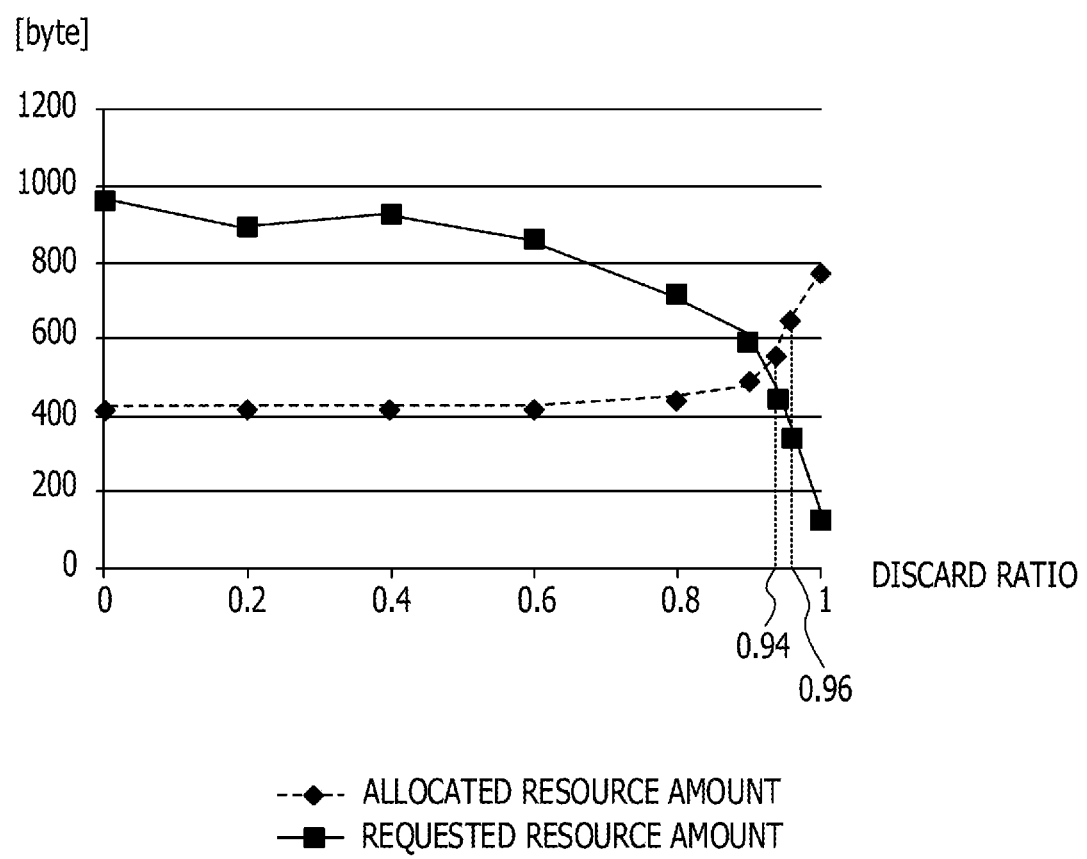
FIG. 14 is a diagram illustrating an example of a graph of a requested amount of resources and an allocated amount of resources in the AD scheme.
Figure 15:
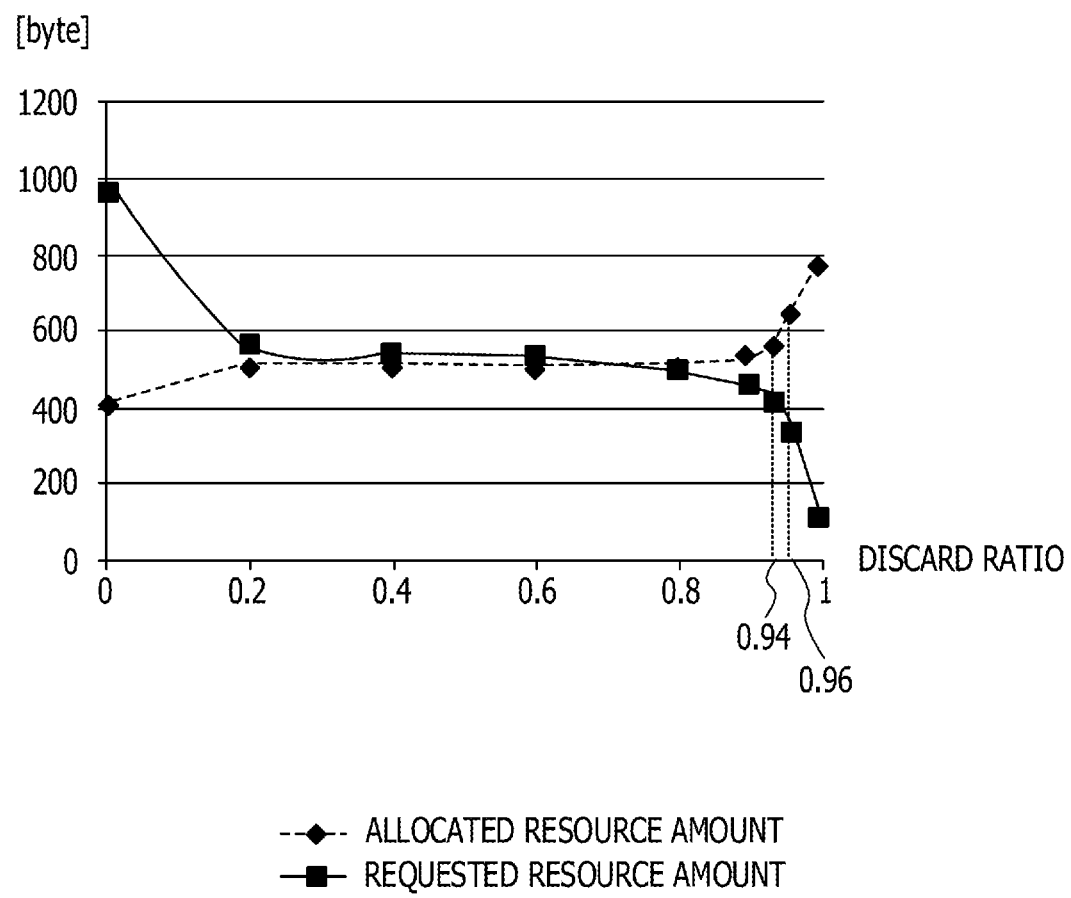
FIG. 15 is a diagram illustrating an example of a graph of a requested amount of resources and an allocated amount of resources in the HD scheme.

Furthermore, FIGS. 14 and 15 are diagrams illustrating examples of graphs of the requested amount of resources and the allocated amount of resources in the AD scheme and the HD scheme, respectively. The format of the graphs is the same as in FIG. 13.

Figure 16:
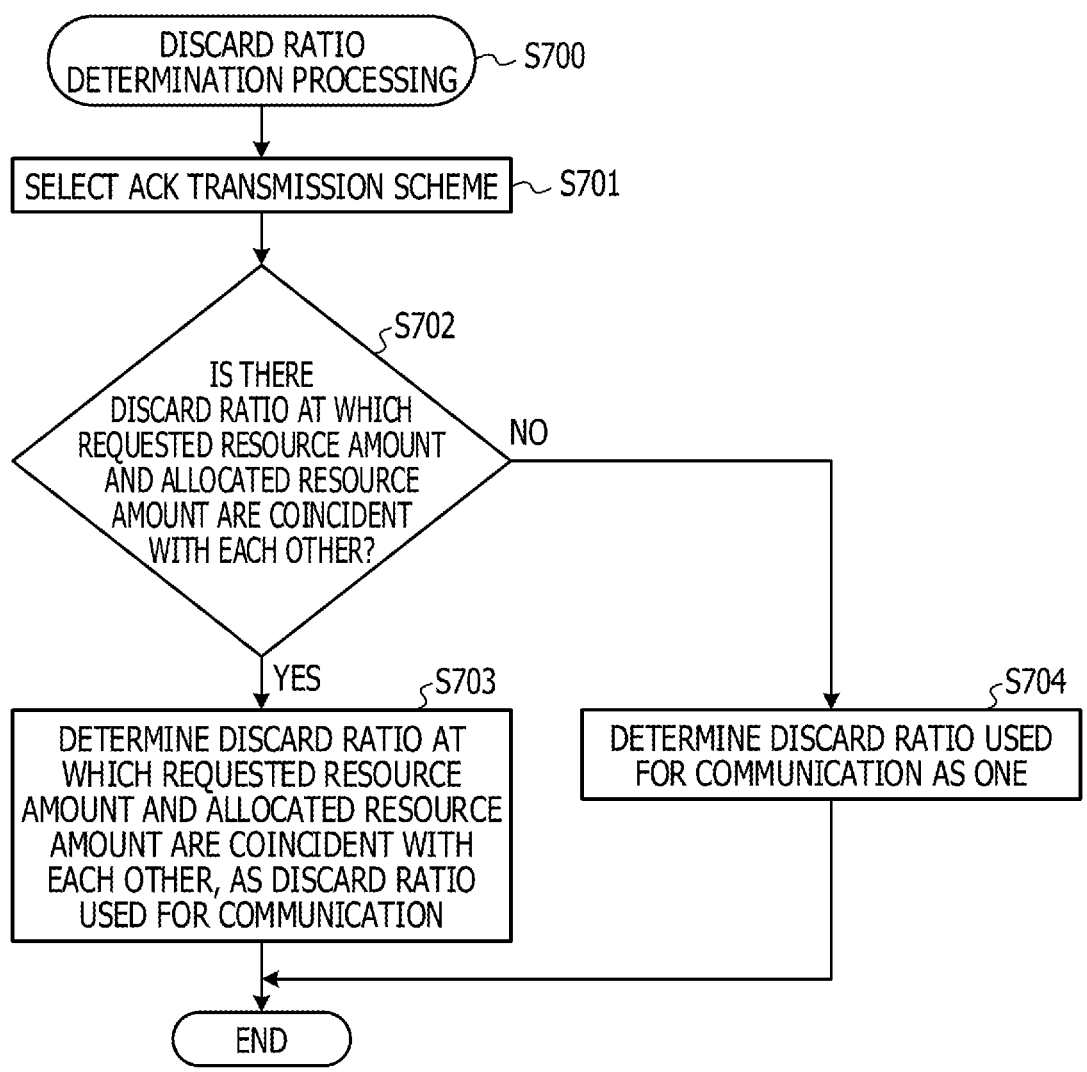
FIG. 16 is a diagram illustrating an example of a process flowchart of discard ratio determination processing.

FIG. 16 is a diagram illustrating an example of a process flowchart of the discard ratio determination processing. The communication device 100 selects an ACK transmission scheme (S701). The communication device 100 confirms whether or not there is a discard ratio at which the requested amount of resources and the allocated amount of resources are coincident with each other in the selected ACK transmission scheme (S702).

In a case where there is a discard ratio at which the requested amount of resources and the allocated amount of resources are coincident with each other (Yes in S702), the communication device 100 determines the discard ratio at which the requested amount of resources and the allocated amount of resources are coincident with each other, as the discard ratio used for communication (S703).

On the other hand, in a case where there is no discard ratio at which the requested amount of resources and the allocated amount of resources are coincident with each other (No in S702), the communication device 100 determines the discard ratio to be used as one (S704). For example, in FIG. 13, since there is no discard ratio at which the requested amount of resources and the allocated amount of resources are coincident with each other, the communication device 100 determines the discard ratio in the PD scheme as one.

Hereinafter, the discard ratio determination processing will be described using as an example a case where the communication device 100 selects the HD scheme.

The communication device 100 ascertains, from FIG. 15, that there is a discard ratio at which the requested amount of resources and the allocated amount of resources are coincident with each other in the HD scheme (Yes in S702 in FIG. 16). For example, in FIG. 15, the requested amount of resources and the allocated amount of resources are coincident with each other around the discard ratio 0.8. Note that a condition in which the requested amount of resources and the allocated amount of resources are coincident with each other includes a case where a difference between the requested amount of resources and the allocated amount of resources is within a threshold (second threshold), as well as a case where the requested amount of resources and the allocated amount of resources have exactly the same numerical value. Then, as for the discard ratio in the HD scheme, the communication device 100 determines the discard ratio 0.8 at which the requested amount of resources and the allocated amount of resources are coincident with each other, as the discard ratio used for communication (S703 in FIG. 16).

Consequently, the communication device 100 may mitigate the occurrence of an imbalance between the uplink resources and the downlink resources due to a large difference produced between the requested amount of resources and the allocated amount of resources, and may efficiently use the wireless resources.

<4. Fourth Discard Ratio Determination Processing>

The fourth discard ratio determination processing is processing for determining the discard ratio based on the number of ACK transmissions, the requested amount of resources, and the allocated amount of resources. The number of ACK transmissions, the requested amount of resources, and the allocated amount of resources are, for example, numerical values indicating the state of wireless connection between the communication device 100 and the base station device 200.

For example, during the actual operation of the communication system 10, the communication device 100 changes the ACK transmission scheme and the discard ratio to measure the requested amount of resources and the allocated amount of resources. Alternatively, for example, the communication device 100 may execute a simulation before being installed in the communication system 10 to acquire the requested amount of resources and the allocated amount of resources.

Figure 17:
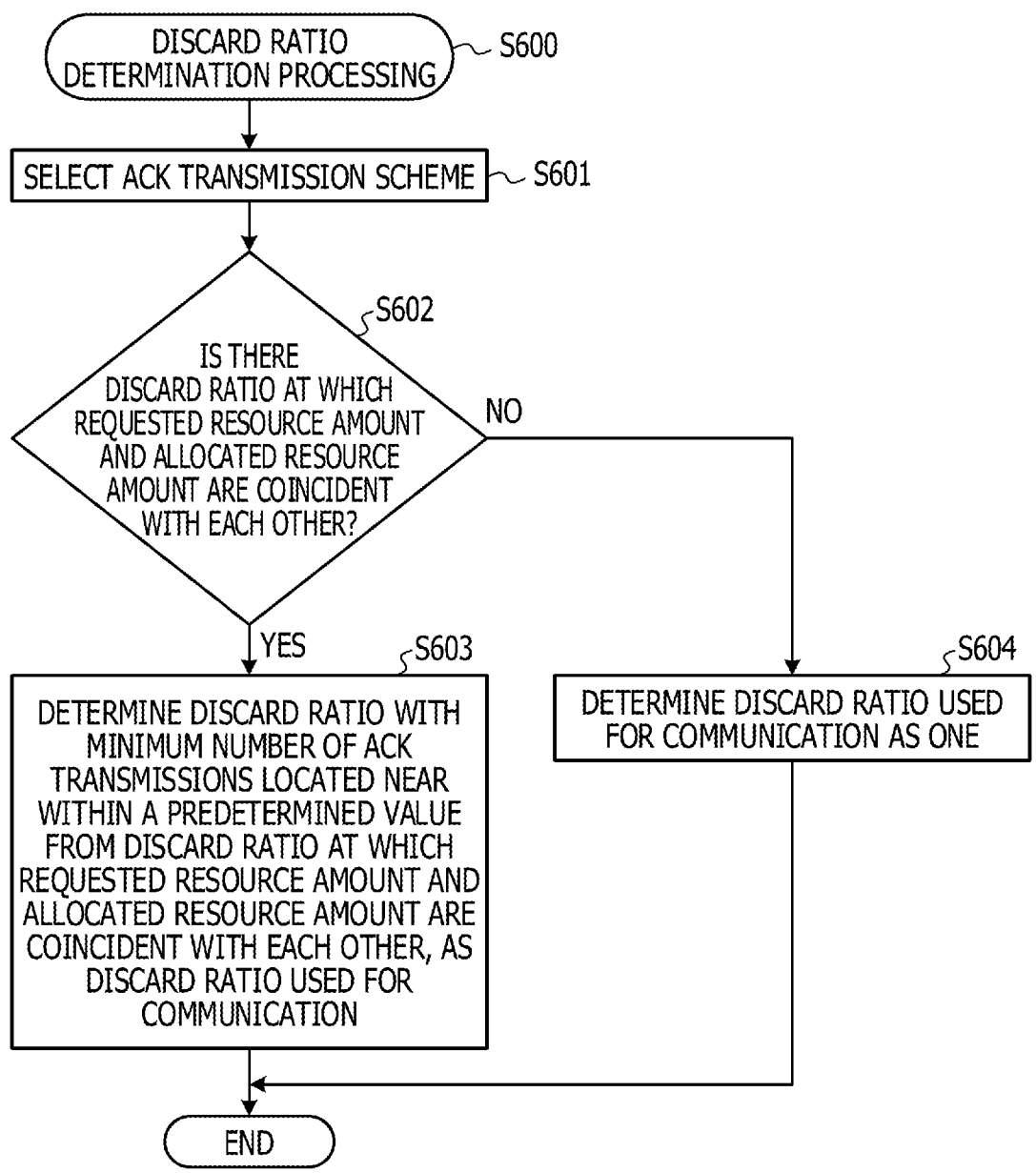
FIG. 17 is a diagram illustrating an example of a process flowchart of discard ratio determination processing.

FIG. 17 is a diagram illustrating an example of a process flowchart of the discard ratio determination processing. The communication device 100 selects an ACK transmission scheme (S601). The communication device 100 confirms whether or not there is a discard ratio at which the requested amount of resources and the allocated amount of resources are coincident with each other in the selected ACK transmission scheme (S602).

In a case where there is a discard ratio at which the requested amount of resources and the allocated amount of resources are coincident with each other (Yes in S602), the communication device 100 determines a discard ratio with the minimum number of ACK transmissions located near within a predetermined value from the discard ratio at which the requested amount of resources and the allocated amount of resources are coincident with each other, as the discard ratio used for communication (S603).

On the other hand, in a case where there is no discard ratio at which the requested amount of resources and the allocated amount of resources are coincident with each other (No in S602), the communication device 100 determines the discard ratio to be used as one (S604).

Hereinafter, the discard ratio determination processing will be described using as an example a case where the communication device 100 selects the AD scheme.

The communication device 100 ascertains, from FIG. 14, that there is a discard ratio at which the requested amount of resources and the allocated amount of resources are coincident with each other in the AD scheme (Yes in S602 in FIG. 17). For example, in FIG. 14, there is a discard ratio at which the requested amount of resources and the allocated amount of resources are coincident with each other, around the discard ratio 0.94. Then, the communication device 100 determines a discard ratio with the minimum number of ACK transmissions located within a predetermined number (for example, 0.2) from the discard ratio 0.94, at which the requested amount of resources and the allocated amount of resources are coincident with each other, as the discard ratio used for communication (S603 in FIG. 17). The communication device 100 determines the discard ratio as 0.96 from the number of ACK transmissions in the AD scheme in FIG. 10B.

Consequently, the communication device 100 may determine the discard ratio considering not only the requested amount of resources and the allocated amount of resources but also the number of ACK transmissions.

OTHER EMBODIMENTS

The processing in each embodiment may be mutually combined.

For example, the communication device 100 may calculate the discard ratios and the numbers of ACK transmissions for all ACK transmission schemes in the fourth discard ratio determination processing in the second embodiment, to determine an ACK transmission scheme with the minimum number of ACK transmissions.

Furthermore, for example, the communication device 100 may use the throughput as a metric instead of the number of ACK transmissions in the fourth discard ratio determination processing in the second embodiment.

Moreover, based on a part or all of the number of ACK transmissions, the throughput, the requested amount of resources, and the allocated amount of resources, a discard ratio with an appropriate balance between the uplink and downlink wireless amount of resources, or a discard ratio with an appropriate value of the throughput or the number of ACK transmissions may be determined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A first communication device in a communication systems including the first communication device and a second communication device that performs wireless connection with the first communication device and relays communication with the first communication device, the first communication device comprising:
    a receiver configured to receive packets from the second communication device; and
    a transmitter configured to:
        store reception confirmation packets in a buffer, the reception confirmation packets corresponding to the received packets,
        perform transmission of at least a portion of the reception confirmation packets stored in the buffer, and
        discard reception confirmation packets not to be transmitted in the transmission according to a discard ratio; and
    a controller configured to determine the discard ratio used in the communication according to a state of the wireless connection, the state of the wireless connection including a requested amount of resources requested from the second communication device by the first communication device and an allocated amount of resources allocated to the first communication device by the second communication device.

2. The first communication device according to claim 1, wherein
    the controller is configured to determine the discard ratio used in the connection according to a throughput in the wireless connection and a number of transmissions of the reception confirmation packets from the first communication device.

3. The first communication device according to claim 2, wherein
    the controller is configured to determine a discard ratio that is a minimum number of transmissions among discard ratios with the throughput equal to or higher than a first threshold as the discard ratio used in the communication.

4. The first communication device according to claim 2, wherein
    the transmitter is configured to perform one or more types of transmission number determination processing that determine the number of transmissions of the reception confirmation packets in the processing of transmitting at least a part of the reception confirmation packets, and
    the controller is configured to determine the transmission number determination processing used in the communication among the one or more types of transmission number determination processing.

5. The first communication device according to claim 4, wherein
the controller is configured to
select a discard ratio with a minimum number of transmissions from among discard ratios with the throughput equal to or higher than a first threshold for each of the one or more types of transmission number determination processing, and
determine the transmission number determination processing that is a minimum number of transmissions at the selected discard ratio as the transmission number determination processing used in the communication.

6. The first communication device according to claim 1, wherein
the controller is configured to determine a discard ratio at which a difference between the requested amount of resources and the allocated amount of resources is within a second threshold as the discard ratio used in the communication.

7. The first communication device according to claim 1, wherein
the controller is configured to determine the discard ratio according to a number of transmissions of the reception confirmation packets.

8. The first communication device according to claim 7, wherein
the controller is configured to determine a fourth discard ratio that minimums the number of transmissions among fourth discard ratios as the discard ratio used in the communication, the fourth discard ratios being between a second discard ratio and a third discard ratio, the second discard ratio being higher by a predetermined number than a first discard ratio at which a difference between the requested amount of resources and the allocated amount of resources is within a second threshold, the third discard ratio being lower than the first discard ratio by a predetermined number.

9. The first communication device according to claim 4, wherein
the one or more types of transmission number determination processing includes first transmission number determination processing that determines the number of transmissions of the reception confirmation packets according to an allocated amount of resources allocated to the first communication device by the second communication device.

10. The first communication device according to claim 4, wherein
the one or more types of transmission number determination processing includes second transmission number determination processing that determines a number of response confirmation packets stored in the buffer by the receiver, as the number of transmissions of the reception confirmation packets.

11. The first communication device according to claim 4, wherein
the one or more of transmission number determination processing includes third transmission number determination processing that performs both of first transmission number determination processing that determines the number of transmissions of the reception confirmation packets according to an allocated amount of resources allocated to the first communication device by the second communication device, and second transmission number determination processing that determines a number of response confirmation packets stored in the buffer by the receiver, as the number of transmissions of the reception confirmation packets.

12. The first communication device according to claim 1, wherein
the transmitter is configured to transmit, to the second communication device, a reception confirmation packet other than the reception confirmation packets to be discarded.

13. The first communication device according to claim 1, wherein
the discard ratio is defined according to an accumulation threshold of the buffer.

14. A communication system comprising:
a first communication device; and
a second communication device that performs wireless connection with the first communication device and relays communication with the first communication device, wherein the first communication device includes:
a receiver configured to receive packets from the second communication device, and
a transmitter configured to:
store reception confirmation packets corresponding to the received packets in a buffer,
perform transmission at least a portion of the reception confirmation packets stored in the buffer, and
discard reception confirmation packets not to be transmitted in the transmission according to a discard ratio; and
a controller configured to determine the discard ratio used in the communication according to a state of the wireless connection, the state of the wireless connection including a requested amount of resources requested from the second communication device by the first communication device and an allocated amount of resources allocated to the first communication device by the second communication device.

15. A communication method for a first communication device in a communication system including the first communication device and a second communication device that performs wireless connection with the first communication device and relays communication with the first communication device, the communication method comprising:
receiving packets from the second communication device, and
storing reception confirmation packets corresponding to the received packets in a buffer,
performing transmission at least a portion of the reception confirmation packets stored in the buffer, and
discarding reception confirmation packets not to be transmitted in the transmission according to a discard ratio; and
a controller configured to determine the discard ratio used in the communication according to a state of the wireless connection, the state of the wireless connection including a requested amount of resources requested from the second communication device by the first communication device and an allocated amount of resources allocated to the first communication device by the second communication device.

* * * * *